United States Patent
Puffer et al.

[15] 3,667,304
[45] June 6, 1972

[54] RIDING LAWN MOWER FRICTION DRIVE

[72] Inventors: Edward W. Puffer, Galesburg; Howard K. Duncan, Roseville, both of Ill.

[73] Assignee: Outboard Marine Corporation, Waukegan, Ill.

[22] Filed: Sept. 3, 1970

[21] Appl. No.: 69,255

[52] U.S. Cl. ................................................74/197, 74/196
[51] Int. Cl. ...........................................................F16h 15/08
[58] Field of Search .................................74/197, 196, 194

[56] References Cited

UNITED STATES PATENTS

| | | | |
|---|---|---|---|
| 3,529,482 | 9/1970 | Jackson et al. | 74/197 |
| 3,473,622 | 10/1969 | Orr | 74/197 X |
| 2,942,487 | 6/1960 | Claus | 74/197 |
| 1,647,413 | 11/1927 | McPherson | 74/197 |
| 1,492,863 | 5/1924 | Spencer | 74/196 |

Primary Examiner—Leonard H. Gerin
Attorney—Robert E. Clemency, John W. Michael, Gerritt D. Foster, Robert K. Gerling, Bayard H. Michael, Paul R. Puerner, Joseph A. Gemignani, Andrew O. Riteris and Spencer B. Michael

[57] ABSTRACT

Disclosed herein is a riding lawn mower including a friction drive comprising a rotatably driven disc mounted on a frame, together with a bracket which supports a roller and which is movable relative to a position locating the roller in driving engagement with the disc and means on the frame for biasing the bracket so as to initially engage the roller with the disc with a first normal force and for subsequently increasing the normal force between the roller and the disc.

11 Claims, 5 Drawing Figures

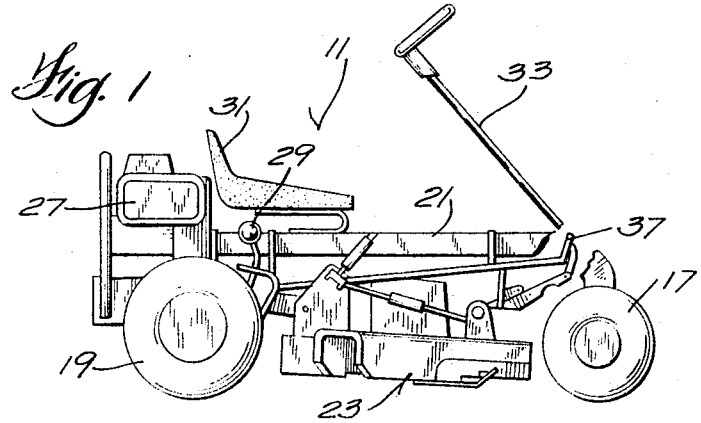
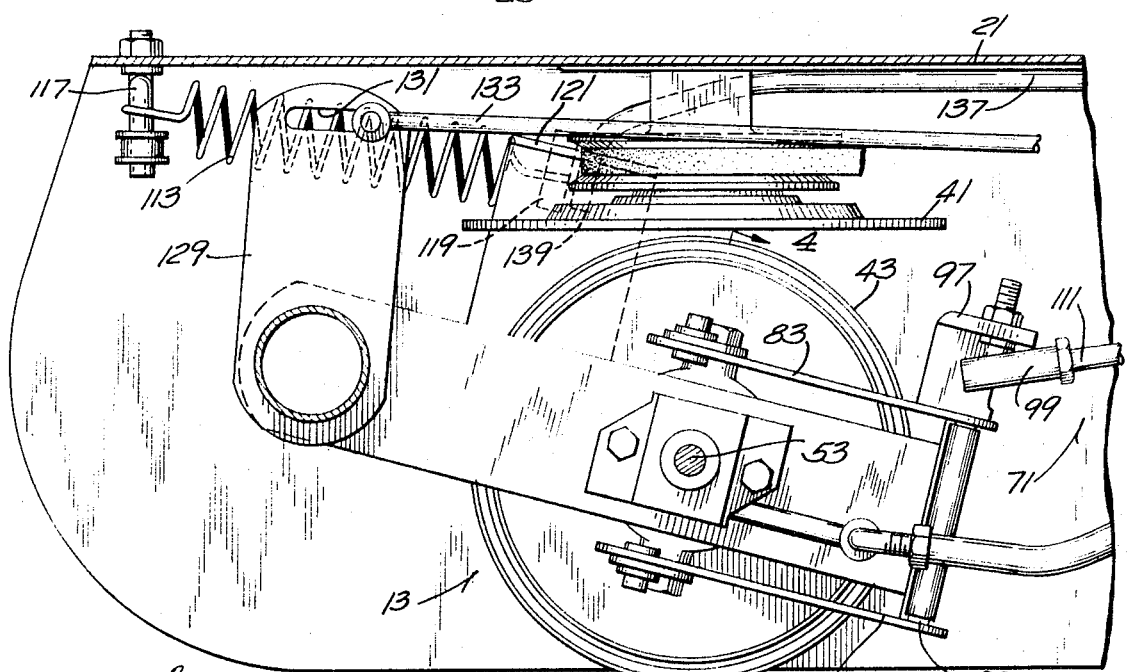
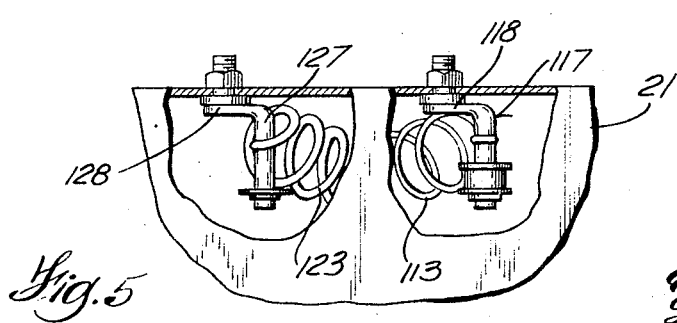

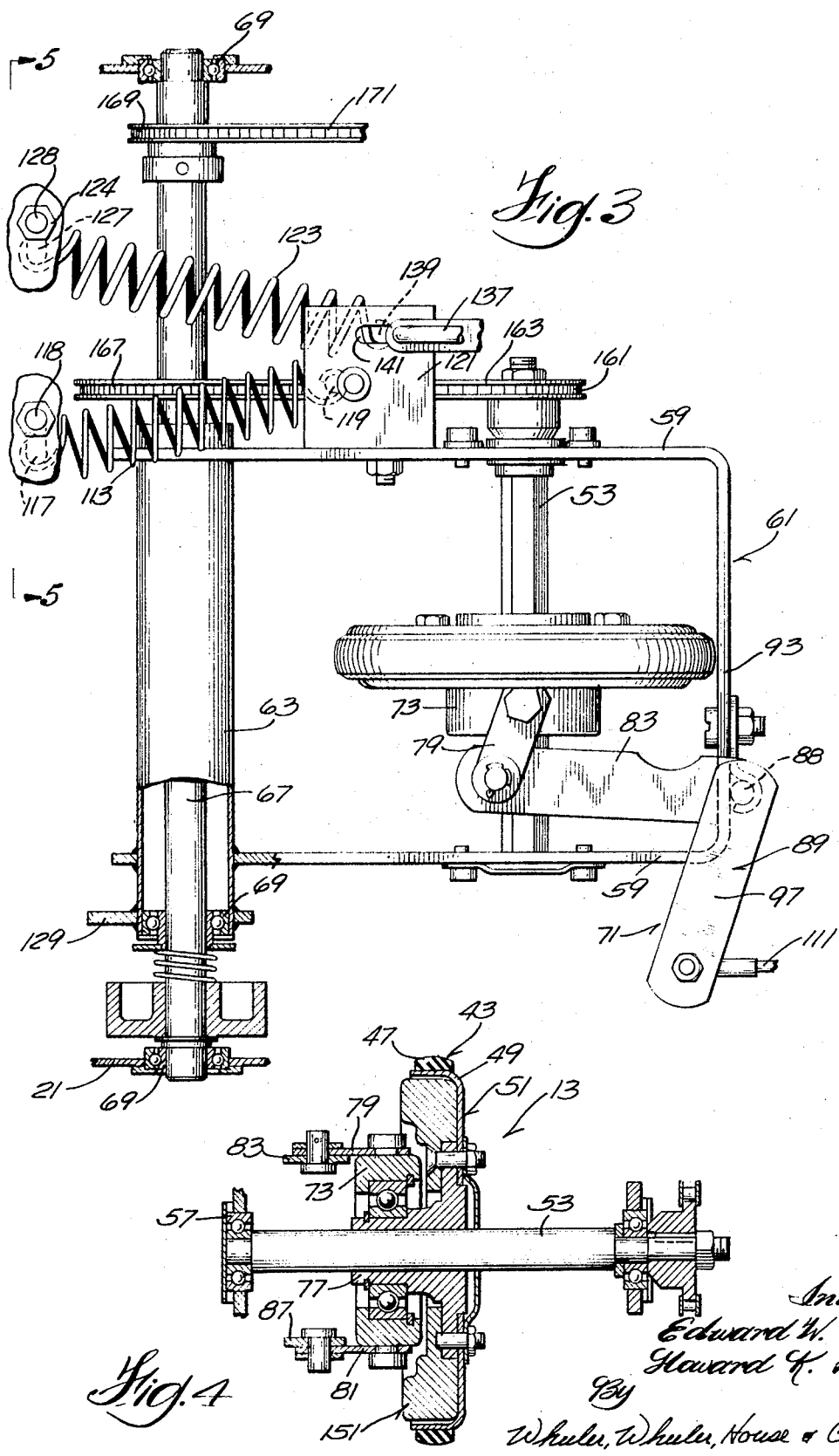

3,667,304

RIDING LAWN MOWER FRICTION DRIVE

BACKGROUND OF THE INVENTION

The invention relates to friction drives and more particularly to riding lawn mowers or other vehicles including friction drives. In this regard, certain prior lawn mowers have included friction drives of the type including a driving disc which is rotated in a fixed plane by an engine and a driven roller which is movable relative to the disc in directions both forward and away from the disc and along a path which is generally diametrically arranged relative to the disc.

Accordingly, when the roller is engaged with the disc, the roller is rotated by the disc, and power transmission occurs. Disengagement of the roller from the disc serves to discontinue power transmission from the disc to the roller and rotation of the roller ceases. Still further, when the roller is engaged with the disc on any point on one side of the rotational axis of the disc, the drive roller rotates in one direction and when the roller is located in engagement with the disc on the other side of the rotational axis of the disc, the roller rotates in the other direction. Varying the radial distance of the engagement of the roller with the disc from the rotational axis of the disc serves to vary the speed of rotation of the roller with respect to any given disc speed.

Prior constructions have included an operating control lever which was operative to actuate a friction drive of the type above explained between three separate forward drive speed conditions, a neutral condition, and a reverse drive condition. The arrangement was such that when in a neutral condition, the control lever served to disengage the roller from the disc, and while in the forward drive and reverse drive conditions, the roller was biased into engagement with the disc by a spring.

The prior constructions also included a foot operated control link which was operative, when depressed by the operator, to disengage the roller from the driving disc whenever the control lever was in any one of the three forward speed conditions. Thus, in the prior constructions it was possible to disengage the roller from the disc by shifting the control lever to neutral or by depressing a foot pedal whenever the control lever was in any one of the forward drive conditions. Engagement of the roller with the driving disc occurred whenever the control lever was shifted to a drive position or whenever pressure on the foot pedal was relieved in response to the action of the before mentioned spring.

The spring biasing the roller into engagement with the driving disc of the previous constructions was sufficiently strong to maintain engagement during travel over rough terrain and could cause relatively rapid engagement of the roller with the disc. Particularly at high forward speed conditions, as well as in other drive conditions, such rapid engagement sometimes could cause relatively quick acceleration. As a consequence, some prior constructions did not enjoy the smoothness of operation as is provided by the construction disclosed hereinafter.

SUMMARY OF THE INVENTION

The invention provides a friction drive which is arranged to provide smooth engagement of a rubber wheel or roller with a disc driven by an engine, thereby avoiding unevenness of operation and providing improved control.

A principal object of the invention is the provision of a friction drive including means for biasing a driven roller into engagement with a driving disc with a first normal force and for subsequently increasing the normal force between the roller and the disc to increase effective power transmission through the friction drive and, at the same time, to provide smooth acceleration and control.

Another principal object of the invention is the provision of a riding lawn mower having a friction drive arrangement including a first spring for biasing a roller supporting bracket into a position locating the roller in engagement with the disc, together with a second spring which is operable to increase the normal force between the roller and the disc after initial engagement of the roller with the disc under the influence of the first spring. Preferably the second spring has a spring rate greater than the spring rate of the first spring.

In this last regard, and in accordance with the invention, the riding mower includes a clutch pedal which is movable to a depressed condition and which is connected to a link having a lost motion connection with the bracket supporting the roller. More particularly, the link is also connected to the heavy or second spring and is movable relative to the bracket between a first position affording an increase in the bias of the engagement of the roller with the disc under the influence of the heavy spring, and a second position affording movement of the link, in response to foot pedal depression, in the direction effecting movement of the bracket away from the position locating the roller in engagement with the disc and in opposition to the first and second springs. Thus, the heavy spring is connected between the frame and the link so as to urge the link (when the foot pedal is not depressed) to the first position and to increase the bias of the engagement of the roller with the disc and so as to oppose movement of the link (when the foot pedal is depressed) from the first position to the second position and to oppose movement of the bracket away from the position locating the roller in engagement with the disc.

Still another principal object of the invention is the provision of a friction drive including a roller which is movable relative to a driving disc and which is provided with an annular weight to increase the inertia of the roller so as to provide smooth starts and smooth continuous power delivery, notwithstanding rough terrain, changes in torque transmission requirements, and any eccentricity which may be present in the roller.

Another object of the invention is the provision of a riding lawn mower which includes an improved friction drive and which will provide a long and useful life.

Still another object of the invention is the provision of a riding mower having a friction drive affording smoother operation than available in prior machines.

Other objects and advantages of the invention will become known by reference to the following description and accompanying drawings.

DRAWINGS

FIG. 1 is a partially broken away, side elevational view of a lawn mower embodying various of the features of the invention.

FIG. 2 is a side elevational view of a portion of the lawn mower shown in FIG. 1.

FIG. 3 is a top plan view, with parts omitted, of that portion of the lawn mower shown in FIG. 2.

FIG. 4 is a sectional view taken generally along line 4—4 of FIG. 2.

FIG. 5 is a sectional view taken generally along line 5—5 of FIG. 3.

GENERAL DESCRIPTION

Shown in the drawings is a riding lawn mower 11 which includes a friction drive arrangement 13 (see FIG. 2) embodying various of the features of the invention. More specifically, the lawn mower 11 includes (see FIG. 1) a steerable pair of front wheels 17 and a pair of power driven rear wheels 19 supporting a frame 21 which carries a cutter blade housing 23 intermediate the front and rear wheels. Located rearwardly on the frame 21 is an engine 27 (shown schematically) which powers the rear wheels 19 through the friction drive arrangement 13 of the invention. A control lever 29 movable between three forward speed positions, a neutral position, and one reverse speed position is mounted on the frame 21 and connected to the friction drive arrangement 13. Located on the frame 21 in front of the engine 27 is a seat 31 for the operator.

The front wheels 17 are steerable by a manually operated drive handle 33. In addition, a foot operated clutch pedal 37, as well as a foot operated brake pedal (not shown) are provided adjacent the front end of the frame 21. In this last regard, the brake foot pedal, when depressed, serves to brake the rear wheels 19 and the clutch foot pedal 37, when depressed, serves to disengage the friction drive arrangement 13. Thus, when the lawn mower is operating in forward drive, depression of both the clutch and foot pedals serves to disengage the drive from the engine 27 to the rear wheels 19 and to simultaneously brake rotation of the rear wheels 19.

The friction drive arrangement 13 comprises a driving disc 41 which is mounted on the frame 21 for rotation by the engine 27 in a fixed generally horizontal plane. Movable relative to positions of engagement with the driving disc is a wheel or roller 43 which preferably has an outer surface of rubber or like material 47 mounted on an annular flange 49 of an otherwise disc-like member 51. In addition, the roller 43 is carried for axial movement on and for common rotation with an axle or shaft 53 rotatably supported by bearings 57 on the opposed legs 59 of a u-shaped bracket 61. In turn, the bracket 61 is unitarily fixed to a sleeve 63 which is journaled for pivotal movement on and relative to a cross shaft 67 rotatably mounted, at its ends, in bearings 69 supported on the frame 21. From the foregoing, the roller 43 is movable into and out of engagement with the driving disc 41 in accordance with the pivotal movement of the bracket 61 and sleeve 63 relative to the cross shaft 67.

The roller 43 is shiftable transversely of the axle 53 by the control lever 29 to provide three forward speed conditions, one neutral condition, and one reverse drive condition by a linkage 71 which includes, at least in part, a collar 73 (See FIG. 4) rotatably mounted relative to a hub 77 on the roller member 51. Pivotally connected to the collar 73 at the diametrically opposite portions thereof are respective links 79 and 81 which are individually pivotally connected to a pair of lever arms 83 and 87 integrally extending (See FIG. 3) from a unitary bell crank 89 including a shaft 88 which connects the lever arms 83 and 87 and which is pivotally mounted transversely of the axle 53 on the connecting web 93 of the U-shaped bracket 61. The bell crank 89 also includes a third arm 97 connected by a universal joint 99 (See FIG. 2) to an actuating rod 111 operable by the control lever 29. Accordingly, control lever movement is operable to shift the roller 43 axially of the axle 53 and relative to the driving disc 41 so as to locate the roller 43, when in the neutral position, in alignment with the rotational axis of the disc 41 and to provide three forward drive roller locations spaced radially with respect to the disc 41 and axially of the axle 53 on one side of the neutral position and to provide one rearward drive roller location spaced radially of the disc 41 and axially of the axle 53 on the other side of the neutral position.

In accordance with the invention, means are provided for biasing the roller carrying bracket 61 to a position locating the roller 43 in engagement with the disc 41. As will be further described herein, such means includes a first or light spring 113 connected, at one end, to a stud 117 on the rearward portion of the frame 21 and connected, at its forward end, to a stud 119 extending from an ear or tab 121 fixedly extending from one of the legs 59 of the U-shaped bracket 61 so as to urge the U-shaped bracket 61 in the counterclockwise direction as shown in FIG. 2 to engage the roller 43 with the disc 41. As will be further explained, the means for biasing the roller 43 into engagement with the disc 41 also includes a second spring 123 which has a heavier action than the first spring 113, i.e., for instance, the spring 123 can have a greater spring rate than the spring 113, and which, like the first spring 113 is connected, at its rearward end, to a stud 127 extending from the frame 21 and, at its forward end, as will be explained, to the ear or tab 121.

The studs 117 and 127 extend respectively from separate brackets 118 and 128 which are adjustably fixed on the frame 21 through respective bolted connections so as to permit swinging of the brackets 118 and 128 about the bolted connections to afford adjustment of the tensions in the springs 113 and 123 to provide action in accordance with the invention. Any suitable means can be employed to retain connection of the springs 113 and 123 to the studs 117, 119, and 127 and, as will be explained, to a bent end portion 139 of a rod or link 137.

The control arrangement for the friction drive 13 further includes means operable by the control lever 29 to pivot the U-shaped bracket 61 in the clockwise direction (as shown in FIG. 2) so as to disengage the roller 43 from the disc 41. In this last regard, the sleeve 63 has extending therefrom a fixed arm 129 having, at its outer end, a slot 131. Extending into the slot 131 is an actuating rod 133 which is regulated by the control lever 29 and which is located such that the rod 133 engages the forward end of the slot 131 to pivot the U-shaped bracket 61 in the clockwise direction (as shown in FIG. 2) to disengage the roller 43 from the disc 41 whenever the control lever 29 is in neutral position. When the control lever 29 is shifted from neutral to either of the forward or rearward drive positions, the actuating rod 133 moves rearwardly, permitting the springs 113 and 123 to pivot the U-shaped bracket 61 into position engaging the roller 43 with the disc 41.

In addition to the foregoing, as has already been noted, the U-shaped bracket 61 can be swung, in the clockwise direction as shown in FIG. 2, to disengage the roller 43 from the disc 41 by another actuating rod or link 137 which is movable rearwardly and forwardly of the frame and is connected, at its forward end, to the clutch foot pedal 37. At its rearward end, the actuating link 137 is connected to the ear or tab 121 on the U-shaped bracket 61 in such manner so as to afford the advantages of the invention.

In this last regard, and in accordance with the invention, means are provided, when engaging the friction drive arrangement 13 by relieving pressure on the clutch foot pedal 37, for initially engaging the roller 41 with the disc 43 with a relatively small normal force and for subsequently engaging the roller 43 with the disc 41 with a heavier normal force. As a result, some initial slippage is permitted between the roller 43 and the disc 41 to avoid immediate full transmission of power through the friction drive 13 while nevertheless transmitting sufficient power to start the vehicle moving from a non-moving condition in such manner as to provide smooth acceleration and control. The subsequent application of a greater normal force engaging the roller 43 with the disc 41 serves to substantially eliminate slippage and to afford full power transmission which occurs more smoothly than if immediate full power transmission occurs through the friction drive arrangement.

Thus, in accordance with the invention, the second or heavier spring 123 is connected, at its forward end, to a bent end portion 139 of the clutch foot pedal actuating link 137 and the clutch foot actuating link 137 is connected to the ear 121 by a lost motion arrangement including a fore and aft slot 141 (See FIG. 3) in the ear or tab 121 and projection of the bent end portion 139 of the clutch foot pedal actuating link 137 through the slot 141. Thus, the clutch foot pedal actuating link 137 is biased by the heavy spring 123 toward a position at the rearward end of the slot 141, which biasing action serves to augment the normal force applied by the lighter spring 113 to engage the roller 43 with the disc 41.

The link 137 is movable forwardly incident to initial depression of the clutch foot pedal 37 and in opposition to the heavy spring 123 to a position at the forward end of the slot 141, which position is effective to swing the U-shaped bracket 61 in a clockwise direction, as shown in FIG. 2, to disengage the roller 43 from the disc 41 in response to continued forward movement of the actuating link 137 occurring incident to continued depression of the clutch foot pedal 37.

Upon gradual release of the clutch foot pedal 37, the heavy spring 123 urges the actuating link 137 rearwardly, thereby permitting counterclockwise pivoting of the U-shaped bracket 61 in response to the action of the light spring 113 into a position engaging the roller 43 with the disc 41 with a relatively light normal force so as to afford partial power transfer and sufficient slippage to provide smooth acceleration. As pressure on the clutch foot pedal 37 is fully removed, and after initial engagement of the roller 43 with the disc 41 in response to the action of the light spring 113, the heavy spring 123 causes the bent end portion 139 of the actuating link 137 to move to the rear end of the slot 131. Upon engagement of the bent end portion 139 with the rearward end of the slot 131, the biasing action of the heavier spring 123 serves to bias the U-shaped bracket 61 so as to increase the pressure of the engagement between the roller 43 and the disc 41 to avoid material slippage and to obtain full power transfer.

Accordingly, upon release of pressure on the clutch foot pedal 37, the roller 43 is first slightly engaged with the disc 41 to permit partial power transfer with some slippage by reason of the action of the light spring 113 and thereafter the pressure of the engagement of the roller 43 with the disc 41 is increased by the heavier spring 123 to avoid slippage between the disc 41 and the roller 43 and to obtain full power transfer in a smooth operation without jumpiness.

Also in accordance with the invention, the roller 43 is provided with a weight or flywheel in the nature of an inner annular ring or member 151 underlying the annular flange 49 and connected to the disc-like member 51. Accordingly, the ring 151 rotates with the roller 43 and adds an initial rotating inertial load as the roller 43 is engaged with the disc 41. This initial inertial load is effective, as the roller 43 begins to rotate under the action of the spring 113, to create slippage between the roller 43 and the driving disc 41 so as to enhance smooth starting. In addition, the annular ring or weight 151 serves to prevent slippage between the disc 41 and the roller 43 under full speed operating conditions due to the inertial action of the rotating weight or annular ring 151.

Power can be delivered from the axle 53 driven by the roller 43 to the rear drive wheels 19 in any suitable fashion. Thus, in the disclosed construction, the axle 53 includes a sprocket 161 which is connected by a chain 163 to another sprocket 167 on the cross shaft 67 which additionally carries still another sprocket 169 which ultimately drives the rear wheels 19 through another chain drive 171 only partially shown.

Various of the features of the invention are set forth in the following claims.

What is claimed is:

1. A riding lawn mower including a friction drive comprising a frame, a rotatably driven disc mounted on said frame, a roller adapted to be driven by said disc, means on said frame mounting said roller for movement relative to a position locating said roller in driving engagement with said disc, first spring means connected to said frame and to said roller mounting means for biasing said roller mounting means into said position locating said roller in engagement with said disc, link means mounted on said frame for moving said roller mounting means away from said position locating said roller in engagement with said disc, and second spring means connected between said link means and said frame and operable independently of said first spring means to oppose operation of said link means to move said roller mounting means away from said position and, when said roller mounting means is in said position, to increase the bias of the engagement of said roller with said disc beyond the engagement of said roller with said disc provided by the action of said first spring means.

2. A riding lawn mower in accordance with claim 1 including a weight mounted on said roller.

3. A riding lawn mower in accordance with claim 1 wherein said second spring means has a higher spring rate than the spring rate of said first spring means.

4. A riding lawn mower in accordance with claim 1 wherein said link means includes an actuating link connected to said second spring means to urge said link to a first link position, means connecting said link and said roller mounting means and providing lost motion of said link relative to said roller mounting means between said first position which affords an increase in the bias of the engagement of said roller with said disc in response to the action of said second spring means, and a second position affording movement of said link in the direction effecting movement of said roller mounting means away from said position locating said roller in engagement with said disc and in opposition to said first and second spring means.

5. A riding lawn mower in accordance with claim 4 including other means for moving said means mounting said roller away from said position engaging said roller with said disc.

6. A riding lawn mower in accordance with claim 4 and further including a foot pedal mounted on said frame for movement to a depressed position and connected to said link to cause said link to move in opposition to the bias of said second spring means upon depression of said foot pedal.

7. A friction drive comprising a frame, a rotatably driven disc mounted on said frame, a roller adapted to be driven by said disc, means on said frame mounting said roller for movement relative to a position locating said roller in driving engagement with said disc, means on said frame including first and second sequentially and simultaneously operable springs for biasing said roller mounting means so as to initially engage said roller with said disc with a first normal force and for subsequently increasing the normal force between said roller and said disc.

8. A friction drive in accordance with claim 7 wherein said first spring is connected to said frame and to said roller mounting means for biasing said roller mounting means into said position locating said roller in engagement with said first disc and said second spring is connected between said frame and said roller mounting means for subsequently increasing the normal force between said roller and said disc after initial engagement of said roller with said disc under the influence of said first spring.

9. A friction drive in accordance with claim 8 wherein said second spring has a spring rate greater than the spring rate of said first spring.

10. A friction drive in accordance with claim 8 wherein said means for initially engaging said roller with said disc with a first normal force and for subsequently increasing the normal force between said roller and said disc also includes an actuating link, means connecting said link and said roller mounting means and providing lost motion of said link relative to said roller mounting means between a first position affording an increase in the bias of the engagement of said roller with said disc in response to the action of said second spring, and a second position affording movement of said link in the direction effecting movement of said roller mounting means away from said position locating said roller in engagement with said disc and in opposition to said first and second springs, and said second spring is connected between said frame and said link to urge said link to said first link position and increase the bias of the engagement of said roller with said disc and to oppose movement of said link from said first position to said second position and movement of said roller mounting means away from said position locating said roller in engagement with said disc.

11. A friction drive in accordance with claim 7 including a weight mounted on said roller.

* * * * *